May 29, 1928.

E. B. EVERLY

CASTER

Filed July 5, 1927

1,671,416

Inventor

E. B. Everly

By C. A. Snow & Co

Attorneys

Patented May 29, 1928.

1,671,416

UNITED STATES PATENT OFFICE.

EDGAR B. EVERLY, OF VENTURA, CALIFORNIA.

CASTER.

Application filed July 5, 1927. Serial No. 203,561.

This invention has reference to casters and aims to provide a caster supported in such a way that it may move readily within its support to facilitate the moving of the furniture or article to which the caster is secured.

Another object of the invention is to provide a ball bearing seated in a recess at the upper end of the caster shank, the recess being of a construction to provide a flat surface on which the ball rests, due consideration being given to the construction to prevent the ball bearing from contacting with the caster shank housing, to retard the movement thereof.

A still further object of the invention is to provide spring arms having means to engage within a groove at the upper end of the shank to lock the shank within the housing of the caster.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
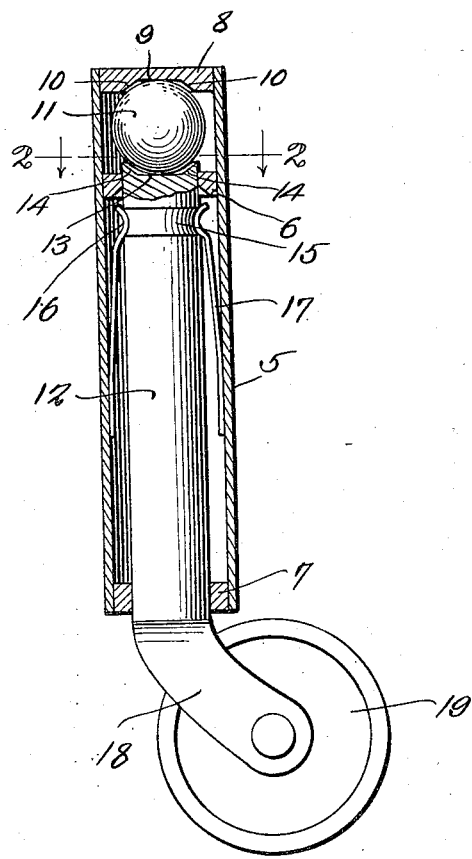
Figure 1 is a longitudinal sectional view through a caster housing and illustrating a caster constructed in accordance with the present invention as supported therein.
Figure 2:
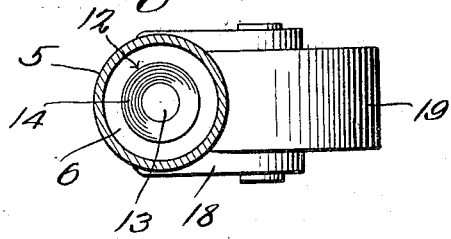
Figure 2 is a sectional view taken on line 2—2 of Figure 1.

Referring to the drawing in detail, the reference character 5 indicates the housing for the caster, the housing being substantially tubular in formation and provided with bearings 6 and 7 respectively, the bearings 7 being supported within the lower end of the housing, while the bearing 6 is supported adjacent to the upper end thereof.

At the upper end of the housing 5 is a bearing 8 which closes the upper end of the housing, the bearing 8 being provided with a recessed portion defining a substantially flat surface 9 and inclined surfaces 10, the inclined surfaces being however constructed in such a way as to lie in spaced relation with the ball bearing 11 supported at the upper end of the shank 12 of the caster.

As clearly shown by Figure 1, the shank 12 is also provided with a recessed portion defining a flat bearing surface 13 and inclined surface 14 that lie in spaced relation with the ball bearing 11, to the end that friction between the shank 12 and member 8 will be reduced to the minimum, owing to the fact that the ball bearing only contacts with a small portion of the bearing 8, or flat surface 9, as well as a small portion of the flat surface 13.

Formed in the shank 12 at a point adjacent to the upper end thereof is a groove 15 that receives the curved end portions 16 of the spring arms 17, which spring arms act to hold the shank 12 against movement longitudinally of the housing 5 as clearly shown by Figure 1.

The lower end of the shank 12 is bifurcated providing arms 18 between which the caster proper indicated at 19 is pivotally mounted.

From the foregoing it will be seen that due to this construction, the caster will move freely within the housing, allowing the article equipped with the caster to be moved with facility without danger of the caster cutting the carpet or surface over which the device is being moved.

I claim:

In a caster, a tubular body portion, a bearing enclosing one end of the tubular body portion, said bearing having a recess formed with inclined walls to receive a ball bearing, a bearing fitted within the tubular body portion and having an opening, a bearing having an opening fitted in the lower end of the tubular body portion, a caster shank extended through the second mentioned bearings and having a curved end portion providing a rest for the ball bearing, said shank having a peripheral groove formed adjacent to the upper end thereof, spring arms secured within the body portion and having curved end portions fitted in the groove to lock the shank within the tubular body portion, and a caster wheel mounted at the lower end of the shank.

In testimony that I claim the foregoing as my own, I have hereto affixed my signature.

EDGAR B. EVERLY.